United States Patent [19]

Morita

[11] Patent Number: 5,247,891
[45] Date of Patent: Sep. 28, 1993

[54] TRANSVERSE ADJUSTABLE LINEAR MOTION GUIDE UNIT

[75] Inventor: Kunihiko Morita, Koganei, Japan
[73] Assignee: Nippon Thompson Co., Ltd., Tokyo, Japan
[21] Appl. No.: 961,196
[22] Filed: Oct. 13, 1992

Related U.S. Application Data

[63] Continuation of Ser. No. 717,446, Jun. 19, 1991, abandoned.

[30] Foreign Application Priority Data

Jun. 20, 1990 [JP] Japan ............... 2-65364[U]

[51] Int. Cl.$^5$ ............... F16C 29/06
[52] U.S. Cl. ............... 104/246; 384/45
[58] Field of Search ............... 105/29.1, 165, 199.1;
104/134, 135, 136, 48, 245, 246, 247; 384/9, 43, 44, 45, 49, 50, 57

[56] References Cited

U.S. PATENT DOCUMENTS

| | | | |
|---|---|---|---|
| 3,292,559 | 12/1966 | Cousins et al. | 105/165 |
| 4,597,709 | 7/1986 | Yonezawa | 104/48 |
| 4,730,945 | 3/1988 | Luther et al. | 384/44 |
| 4,854,741 | 8/1989 | Mottate et al. | 384/45 |
| 4,974,971 | 12/1990 | Tanaka | 384/45 |

FOREIGN PATENT DOCUMENTS

| | | |
|---|---|---|
| 3431462A1 | 8/1984 | Fed. Rep. of Germany . |
| 0079021 | 4/1986 | Japan ............... 384/43 |

OTHER PUBLICATIONS

German catalog (extract) Busak+Luyken, Seals, edition 1986: Turcite-B guide track, Title sheet, p. 33/2, General remarks, p. 33/12, Dimensions.
German catalog (extract, catalog received at the German Patent Office on May 27, 1974), Schneeberger, Longitudinal guides and rolling times, Title sheet, pp. 79, 86, 87.

Primary Examiner—Mark T. Le
Attorney, Agent, or Firm—Skjerven, Morrill, MacPherson, Franklin, & Friel

[57] ABSTRACT

A linear motion rolling contact guide unit includes a rail, a slider assembly and a plurality of rolling members interposed between the rail and the slider assembly so that the slider assembly can move along the rail in any direction. The slider assembly has a two-part structure and is comprised of a pair of first and second sub-assemblies with a low friction intermediate structure interposed therebetween. The first sub-assembly is slidably mounted on the rail and the second sub-assembly is mounted on the first sub-assembly such that the second sub-assembly can move relative to the first sub-assembly in the direction transverse to the longitudinal axis of the rail. Thus, when the present unit is applied to a guide unit of a heavy duty linear motion guide unit system, any error in lateral alignment can be absorbed by the present unit.

11 Claims, 5 Drawing Sheets

TRANSVERSE ADJUSTABLE LINEAR MOTION GUIDE UNIT

This application is a continuation application Ser. No. 07/717,446, filed Jun. 19, 1991, now abandoned.

BACKGROUND OF THE INVENTION

1. Field of the Invention

This invention generally relates to a linear motion guide unit, and, in particular, to a linear motion rolling contact guide unit capable of absorbing an error in alignment in the transverse direction. The present linear motion guide unit is particularly suitable for use in a drive unit of various machining tools, high precision processing apparatuses and testing apparatuses.

2. Description of the Prior Art

A linear motion guide unit for guiding the motion of a relatively large load over a relatively long distance is well know in the art. Typical prior art examples of such a heavy duty linear motion guide unit are shown in FIGS. 6 and 7.

FIG. 6 illustrates a heavy duty linear motion guide unit which includes a pair of rails B and C, which are fixedly attached to a bed A, a plurality (four in the illustrated example) of slider assemblies D and E, and a table F to which the slider assemblies D and E are fixedly attached. The rails B and C extend in parallel over a relatively long distance, and each of the rails B and C is formed with a pair of guide grooves H and I on its opposite side surfaces, which extend in parallel with the longitudinal axis of the rail. Each of the slider assemblies D and E is formed with a pair of endless circulating paths which are filled with a plurality of rolling members and each of which has a load path section where the rolling members are partly exposed to be partly brought into engagement with the corresponding guide groove H or I. As a result, a rolling contact is established between the rails B and C and the associated slider assemblies D and E, so that the table F can move linearly along the rails B and C back and forth as indicated by the double arrow G. Any desired object may be fixedly mounted on the table F.

With the structure shown in FIG. 6, in order to provide an accurate movement, the rolling contact between the rails B and C and the associated slider assemblies D and E is preloaded or set with substantially zero tolerance. However, since there is a limit in arranging the rails B and C in parallel, there is normally an error in the degree of parallel arrangement. Thus, if the rails B and C extend relatively over a long distance, the true distance between the two rails B and C vary or fluctuate, so that the sliding resistance varies as the table moves along the rails B and C. This is quite disadvantageous because of lack of smooth movement, possibility of excessive local wear and unreliability in operation. It is true that the problem could be relaxed if the rails B and C were aligned as accurately as possible. However, this would require excessive care and skills in mounting the rails B and C on the bed A. For example, it would be almost impossible to arrange the rails B and C on the bed A with an accuracy on the order of several tens of microns or less if the rails B and C are a few meters long.

FIG. 7 illustrates another typical prior art heavy duty guide unit. In this case, a pair of rails J and K is fixedly mounted on a base, and a table L is slidably mounted on the rails J and K with a plurality (six in the illustrated example) of endless circulating type bearing units M1 through M6 interposed therebetween. That is, four bearing units M1 through M4 are fixedly mounted on the left end portion of the table L such that they are brought into rolling contact with the respective four surfaces of the rail J. On the other hand, two bearing units M5 and M6 are fixedly mounted on the right end portion of the table L such that they are brought into rolling contact with the respective top and bottom surfaces of the rail K.

With this structure, even if there is an error in parallel alignment between the rails J and K, the bearing units M5 and M6 can move in the transverse direction indicated by the double arrow N to absorb such an error. On the other hand, the left end portion of the table L does not change the relative positional relationship with the rail J since the bearing units M1 and M3 are in rolling contact with the opposite side surfaces of the rail J under pressure. In this case, however, a relatively large number of endless circulating bearing units, which are relatively large in size, must be fixedly mounted on the table L and a relatively large number of lubricant paths must be formed in the table L. As a result, the overall structure tends to be large in size, which is diametrically opposite to the current trend for miniaturization of linear motion guide units. Besides, this structure does not allow to use existing typical linear motion rolling contact guide units and rails therefor.

SUMMARY OF THE INVENTION

In accordance with the present invention, there is provided a linear motion rolling contact guide unit which is suitable for use in heavy duty applications and which can be constructed easily by slightly modifying the existing linear motion rolling contact guide units.

In accordance with one embodiment of the present invention, there is provided a linear motion rolling contact guide unit, which generally includes a rail, a slider assembly, and a plurality of rolling members interposed between the rail and the slider assembly. The slider assembly has a two-part structure and typically the slider assembly includes a first sub-assembly and a second sub-assembly which may move relative to each other over a predetermined distance. Typically, the second sub-assembly is movably mounted on the first sub-assembly such that the second sub-assembly may move relative to the first sub-assembly transversely over a predetermined distance. Preferably, a sliding means is provided between the first and second sub-assemblies so as to allow the second sub-assembly to move relative to the first sub-assembly relatively easily. For example, the sliding means may be rolling members or a low friction sheet. In the preferred embodiment, a pair of stopper members are provided in either of the first and second sub-assemblies so as to determine the stroke of relative movement between the first and second sub-assemblies.

When used in heavy duty applications, the present linear motion guide unit may be used, for example, for those linear motion guide units D and E which are associated with one of the two rails B and C in the structure illustrated in FIG. 6. For example, in one embodiment, the present linear motion guide unit may be used for those guide units D and E which are slidably mounted on the rail C while using the conventional linear motion guide units for those guide units D and E which are associated with the other rail B. With this structure, even if there is an error on the order of several tens of microns in the degree of parallel alignment between the two rails B and C, such an error can be suitably absorbed by the present linear motion guide units so that the table F can move very smoothly and at high accuracy all along without experience any fluctuation in sliding resistance. If desired, however, the present linear motion guide unit can be applied to every one of the guide units D and E which are fixedly mounted on the table F.

It is therefore a primary object of the present invention to provide an improved linear motion rolling contact guide unit.

Another object of the present invention is to provide a linear motion rolling contact guide unit particularly suitable for use in heavy duty applications.

A further object of the present invention is to provide a linear motion rolling contact guide unit capable of absorbing errors in alignment in the transverse direction.

A still further object of the present invention is to provide a linear motion rolling contact guide unit high in accuracy, compact in size, sturdy in structure and smooth in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
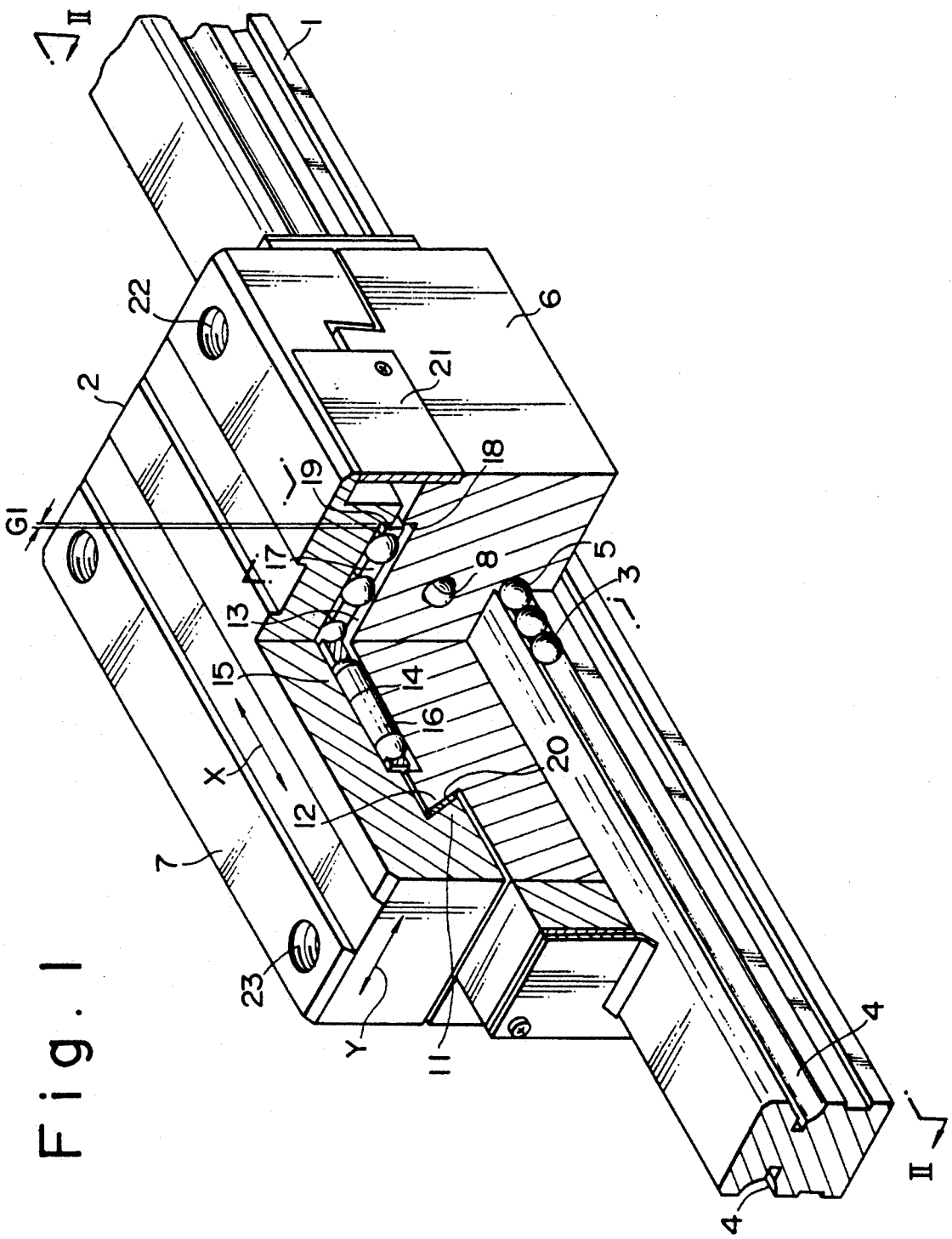
FIG. 1 is a schematic illustration showing in perspective view a linear motion rolling contact guide unit constructed in accordance with one embodiment of the present invention.
Figure 2:
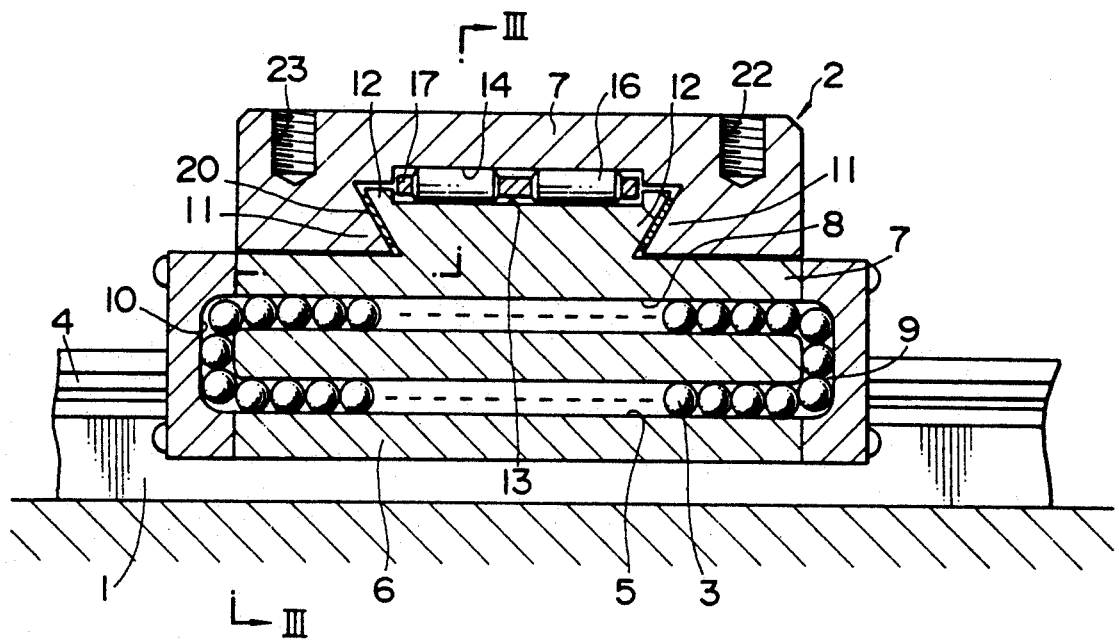
FIG. 2 is a schematic illustration showing the longitudinal cross section of the guide unit shown in FIG. 1 taken along line II—II indicated in FIG. 1.
Figure 3:
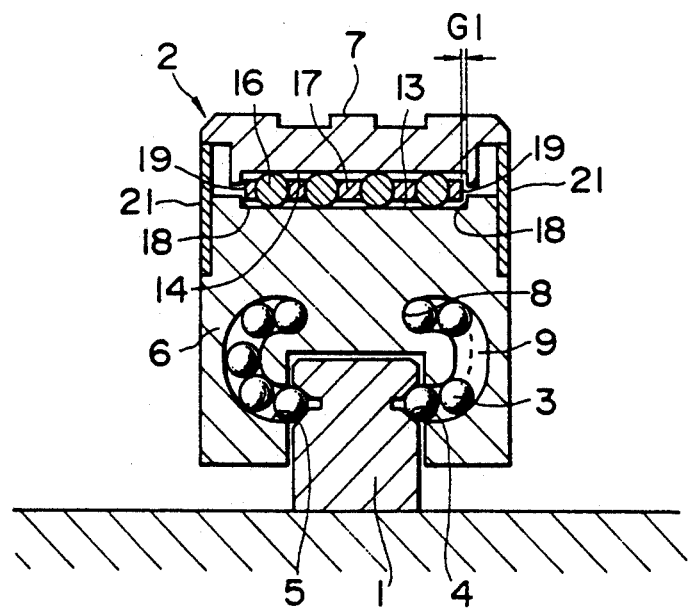
FIG. 3 is a schematic illustration showing the transverse cross section of the guide unit shown in FIG. 1 taken along line III—III indicated in FIG. 2.

Referring now to FIGS. 1 through 3, there is schematically shown a linear motion rolling contact guide unit constructed in accordance with one embodiment of the present invention. As shown, the present linear motion guide unit generally includes a rail 1, a slider assembly 2 and a plurality of rolling members or balls 3 in the illustrated embodiment. The rail 1 is generally rectangular in cross section and thus has a flat top and bottom surface and a pair of side surfaces each of which is formed with a guide groove 4. The rial 1 extends straight over a desired length, which may be relatively long in the present case, and the guide groove 4 extends in parallel with the longitudinal axis of the rail 1.

In accordance with a feature of the present invention, the slider assembly 2 ha a two-part structure, which includes a first sub-assembly and a second sub-assembly. In the illustrated embodiment, the slider assembly 2 has a lower sub-assembly 6 which corresponds to the first sub-assembly and an upper sub-assembly 7 which corresponds to the second sub-assembly. In the illustrated embodiment, the lower sub-assembly 6 is slidably mounted on the rail 1 such that the lower sub-assembly 6 and thus the slider assembly 2 as a whole can slidingly move along the rail 1 back and forth as indicated by a double arrow X. For this purpose, the lower sub-assembly 6 is formed with a pair of endless circulating paths as best shown in FIGS. 2 and 3. Each of the endless circulating paths includes a load path section 5, a return path section 8 and a pair of curved connecting path sections 9 and 10, each connecting the corresponding ends of the load and return path sections 5 and 8. A plurality of balls 3 as rolling members are provided in each of the endless circulating paths. The load path section 5 has an elongated window so that the balls 3 are partly exposed while located at the load path section 5, and those exposed portions of the balls 3 are received in the corresponding guide groove 4 as best shown in FIG. 3. Thus, a rolling contact is provided between the rail 1 and the lower sub-assembly 6 or slider assembly 2 as a whole. Since the balls 3 can roll along the endless circulating paths, the slider assembly 2 may move along the rail 1 as long as the rail 1 exists. The rolling contact between the rail 1 and the lower sub-assembly 6 through the balls 3 may be set at substantially zero tolerance or under pressure For example, the balls 3 may be designed to be preloaded when assembled.

In accordance with the present invention, a dove tail guide projection 12 is formed at the top surface of the lower sub-assembly 6 extending in a transverse direction perpendicular to the longitudinal direction of the rail 1. The upper sub-assembly 7 is formed with a dove tail guide groove 11 which generally corresponds in shape to the dove tail guide projection 12 of the lower sub-assembly 6. A plurality of rolling members 15, or needle rollers 16 in the illustrated embodiment, are disposed between a bottom sliding surface 13 of the dove tail guide projection 12 and a top sliding surface 14 of the dove tail guide groove 14. The plurality of needle rollers 16 are maintained in a predetermined relative positional relation by a cage 17. Thus, the upper sub-assembly 7 may move relative to the lower sub-assembly 6 in the transverse direction as indicated by a double arrow Y in FIG. 1.

In the illustrated embodiment, the bottom sliding surface 13 is formed as recessed at the top surface of the dove tail guide projection 12. And, the top sliding surface 14 is formed as recessed at the bottom surface of the dove tail guide groove 11. Accordingly, a gap G1 is defined between one side of either of recessed bottom or top sliding surface 13 or 14 and a corresponding edge of the cage 17 as best shown in FIG. 3. Thus, the range of transverse movement of the upper sub-assembly 7 relative to the lower sub-assembly 6 is limited by an engagement between the side of either of the recessed bottom or top sliding surface 13 and 14 and the corresponding edge of the cage 17. As a result, the range of relative movement between the lower and upper sub-assemblies 6 and 7 is rather limited and may be set at any desired value. In addition, use may be made of any other structure for limiting the range of transverse movement of the upper sub-assembly 7 relative to the lower sub-assembly 6.

A lubricating sheet 20 comprised of a low friction material is interposed between a pair of opposed sliding surfaces defined between the dove tail guide groove 11 and the dove tail guide projection 12. With the provision of this lubricating sheet 20, the upper sub-assembly 7 may move transversely relative to the lower sub-assembly 6 at high accuracy and yet with low friction. A pair of stopper plates 21 is also fixedly mounted on both sides of the lower sub-assembly 6 for preventing the upper sub-assembly 7 from slipping away. The upper sub-assembly 7 is also provided with a plurality (four in this embodiment) of threaded holes 22 and 23 for use in having a desired object mounted on the top surface of the upper sub-assembly 7.

In one example, the present linear motion guide unit having the above-described structure may be used for those guide units D and E which are fixedly mounted on the table E and which are associated with the rail B. In this structure, those guide units D and E which are fixedly attached to the table F and which are associated with the other rail C may be conventional in structure. With this structure, even if there is an error in parallel alignment between the two rails B and C, such an error can be suitably absorbed by the present linear motion guide units D and E associated with the rail B. Since the linear motion guide unit described with reference to FIGS. 1 through 3 is similar in structure to the conventional linear motion guide unit excepting the additional provision of its transversely movable upper sub-assembly, the present linear motion guide unit can be constructed by slightly modifying the conventional linear motion guide unit.

Figure 4:
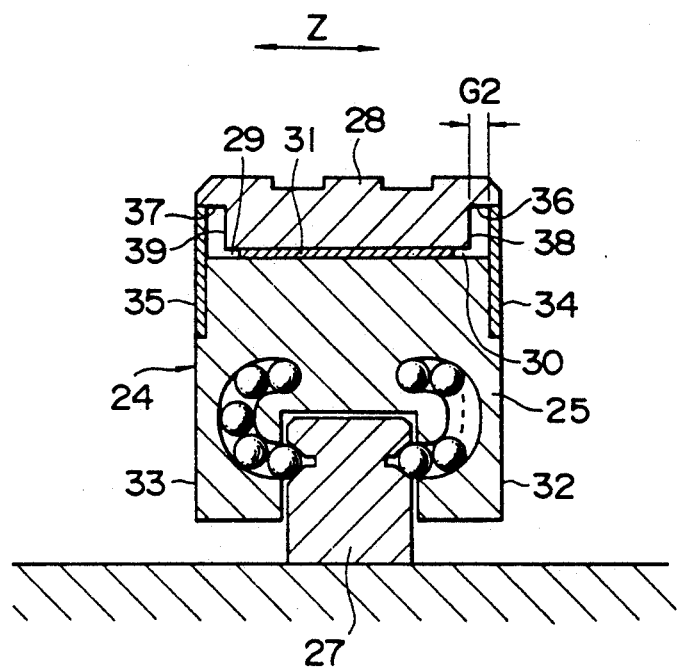
FIG. 4 is a schematic illustration showing the longitudinal cross section of a linear motion guide unit constructed in accordance with another embodiment of the present invention.
Figure 5:
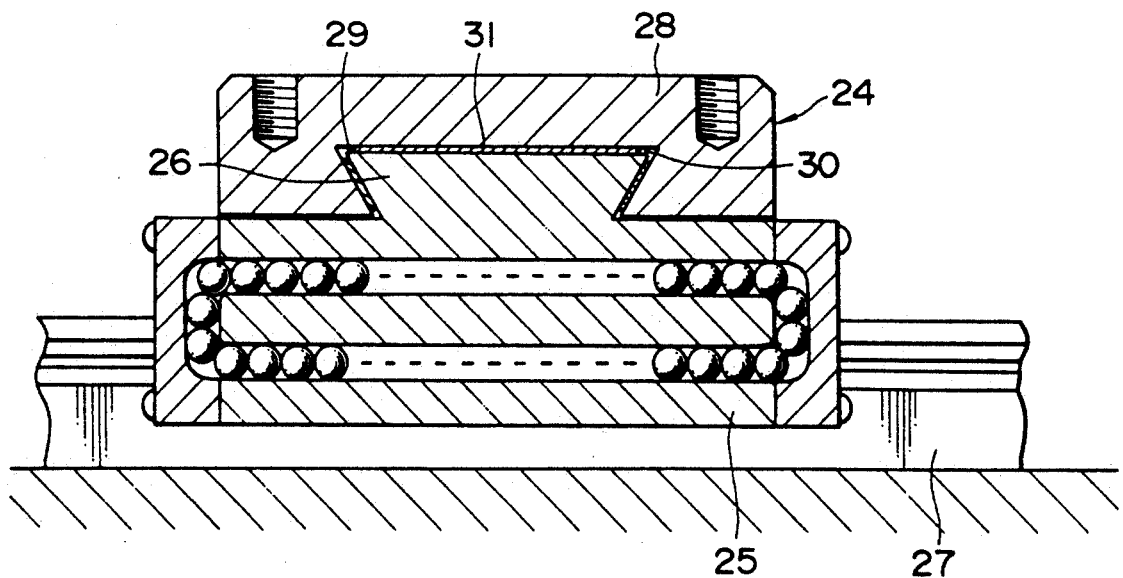
FIG. 5 is a schematic illustration showing the transverse cross section of the guide unit shown in FIG. 4.

FIGS. 4 and 5 illustrate another embodiment of the present invention, which is similar in many respects to the above-described embodiment. That is, the linear motion guide unit of the present embodiment generally includes a rail 27, a slider assembly 24 and a plurality of rolling members 3 or balls in this embodiment. The rail 27 is substantially identical in structure to the rail 1 of the above-described embodiment. The slider assembly 24 of the present embodiment also has a two-part structure which includes a first sub-assembly and a second sub-assembly movable relative to each other in a predetermined direction. In the present embodiment, the slider assembly 24 includes a lower sub-assembly 25 and an upper sub-assembly 28 which is movable relative to the lower sub-assembly 25 in the direction transverse to the longitudinal axis of the rail 27. As easily understood when comparing FIG. 5 with FIG. 2, the lower sub-assembly 25 of the present embodiment is very similar in structure to the lower sub-assembly 6 of the previous embodiment excepting the fact that a recessed sliding surface is not provided at the top surface of a dove tail guide projection 26. Besides, the upper sub-assembly 28 of the present embodiment is very similar in structure to the upper sub-assembly 7 of the previous embodiment excepting the fact that a recessed sliding surface is not provided at the bottom surface of a dove tail guide groove 30.

In the present embodiment, a flat surface is provided at the top surface of the dove tail guide projection 26 and an opposite flat surface is provided at the bottom surface of the dove tail guide groove 30. And, a lubricating sheet 31 of low friction material, such as silicone family synthetic resins, is provided between the opposite flat surfaces of the dove tail guide projection 26 and groove 30. As a result, the upper sub-assembly 28 may move in the transverse direction relative to the lower sub-assembly 25 with a low friction therebetween.

A pair of stopper plates 34 and 35 is fixedly attached to the lower sub-assembly 33 at its side surfaces 32 and 33, respectively, for preventing the upper sub-assembly 28 from slipping away when it moves in the transverse direction relative to the lower sub-assembly 25. On the other hand, the upper sub-assembly 28 is formed with a pair of side recesses 36 and 37 for receiving therein the upper portions of the stopper plates 34 and 35, respectively. Thus, the transverse movement of the upper sub-assembly 28 is limited by an engagement between one of the stopper plates 34 and 35 and its corresponding side surface of the upper sub-assembly 28 defined in its corresponding side recess 36 or 37. As a result, a gap G2 defined between one of the stopper plates 34 and 35 and the corresponding side surface of the upper sub-assembly 28 defined in the corresponding recessed side determines the maximum stroke of the upper sub-assembly 28 in the transverse direction Z. In this embodiment, therefore, the stopper plates 34 and 35 serve not only to prevent the upper sub-assembly 28 from slipping away but also to determine the stroke of the upper sub-assembly 28 relative to the lower sub-assembly 32 in the transverse direction.

Figure 6:
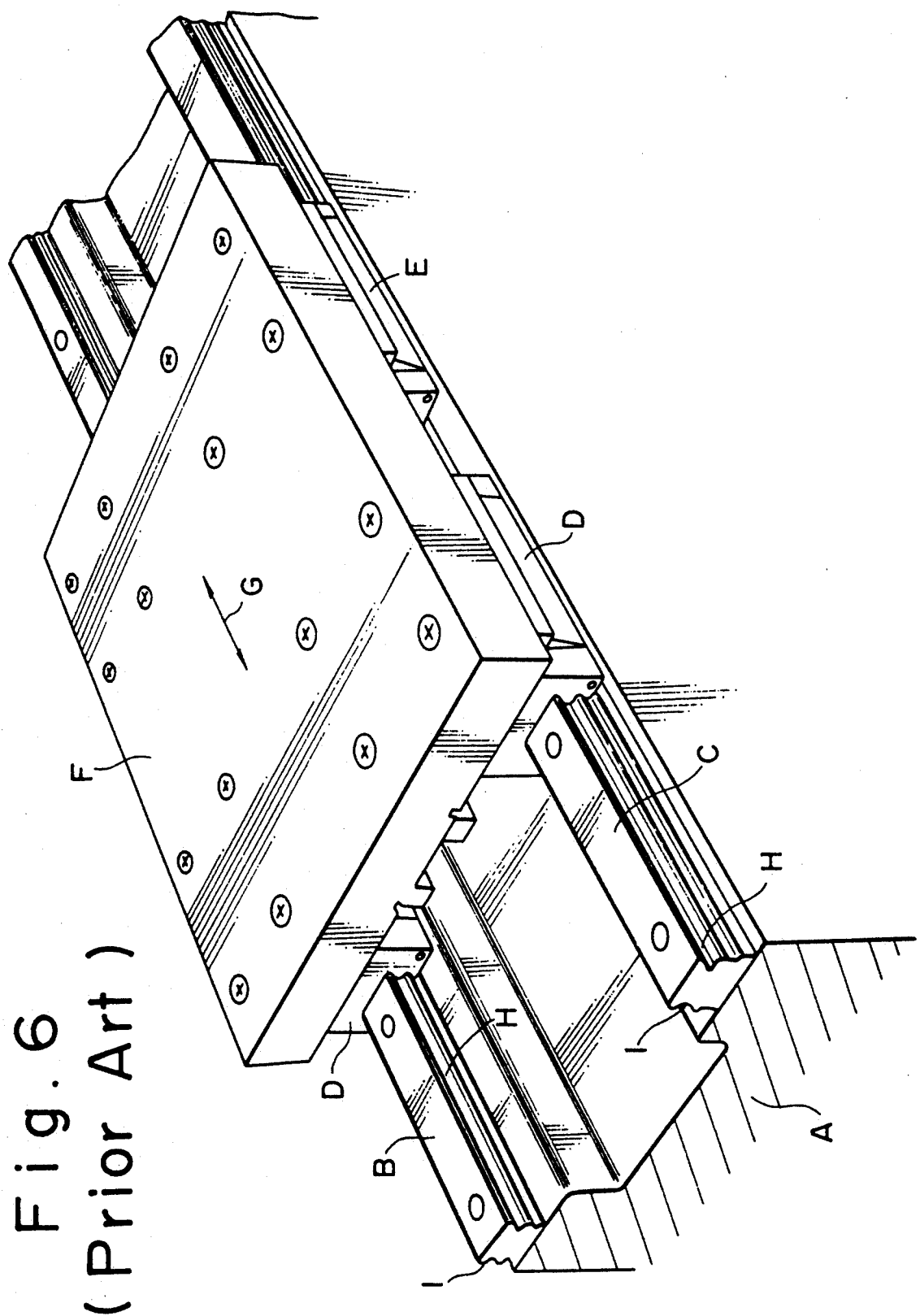
FIG. 6 is a schematic illustration showing in perspective view a typical prior art heavy duty linear motion guide unit system.
Figure 7:
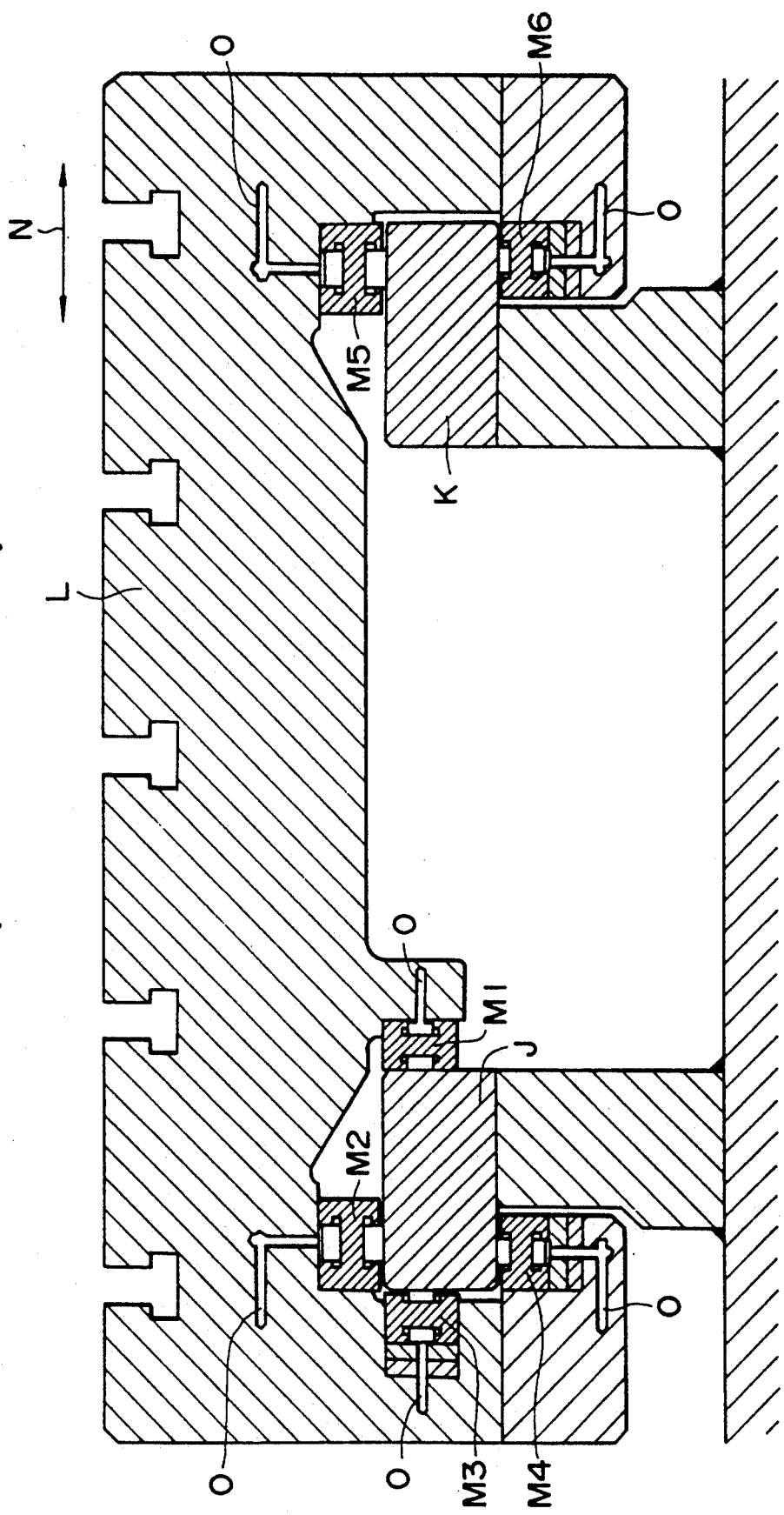
FIG. 7 is a schematic illustration showing in cross section another typical prior art heavy duty linear motion guide unit system.

The above-described second embodiment may be applied to a heavy duty linear motion guide unit assembly shown in FIG. 6 in the same manner as described with respect to the first embodiment. It should be noted, however, that use has been made of needle rollers and a lubricating sheet of low friction material as sliding means between the first (upper) and second (lower) sub-assemblies in the above-described embodiments, use may also be made of any other suitable materials and means, such as cylindrical rollers, balls, a film of low friction material and cam followers.

While the above provides a full and complete disclosure of the preferred embodiments of the present invention, alternate constructions and equivalents may be employed without departing from the true spirit and scope of the invention. Therefore, the above description and illustration should not be construed as limiting the scope of the invention, which is defined by the appended claims.

What is claimed is:
1. A linear motion guide unit, comprising:
   a rail extending over a length;
   a slider assembly sildably mounted on said rail, said slider assembly including a first sub-assembly movable along said rail and a second sub-assembly, means for undetachably mounting said second sub-assembly under normal operating conditions on said first sub-assembly; means for allowing movement of said second sub-assembly relative to said first sub-assembly in a predetermined direction transverse to said rail over a predetermined distance not exceeding a width of said first sub-assembly during movement of said first sub-assembly along said rail, wherein one of said sub-assemblies includes a dove tail projection and the other of said sub-assemblies includes a dove tail groove, and wherein said dove tail projection and said dove tail groove are slidingly interfitted;
   means for providing a low friction interface between said first and second sub-assemblies; and a plurality of rolling members interposed between said rail and said first sub-assembly such that said slider assembly may move along said rail.

2. The unit of claim 1, wherein said rail is formed with a pair of guide groves at its opposite side surfaces and said first sub-assembly is formed with a pair of endless circulating paths in which said plurality of rolling members are provided, each of said endless circulating paths including a load path section, a return path section and a pair of curved connecting path sections connecting corresponding ends of said load and return path sections, whereby said load path section is provided with an elongated window through which those rolling members located in the load path section are partly exposed to be received in the corresponding guide groove of said rail.

3. The unit of claim 1, wherein said low friction interface means includes a plurality of rollers interposed between said first and second sub-assemblies.

4. The unit of claim 1, wherein said low friction interface means includes a lubricating sheet of a low friction material.

5. The unit of claim 1, further comprising limiting means for limiting relative movement between said first and second sub-assemblies in said predetermined direction to a predetermined amount.

6. The unit of claim 5, wherein said limiting means also serve to prevent said second sub-assembly from slipping away from said first sub-assembly.

7. The unit of claim 5, further comprising means for preventing said second sub-assembly from slipping away from said first sub-assembly.

8. The unit of claim 1 wherein said rail includes a pair of parallelly spaced rails, said slider assembly including spaced side surfaces mounted across said pair of rails, and wherein said unit is slidably mounted at least on one of said pair of rails.

9. The unit of claim 1 wherein said low friction interface means includes a second plurality of roller members between sliding surfaces of said dove tail projection and said dove tail groove.

10. The unit of claim 1 wherein said low friction interface means comprises a lubricating sheet interposed between opposed sliding surfaces of said dove tail projection and said dove tail groove.

11. The unit of claim 1 wherein the means for allowing movement of said second sub-assembly not exceeding the width of the first sub-assembly comprises a pair of stopper plates mounted on opposite sides of said first sub-assembly.

* * * * *